United States Patent [19]
Sedlack et al.

[11] Patent Number: 5,551,751
[45] Date of Patent: Sep. 3, 1996

[54] RECLINING RESTRAINT (SMART MOVE)

[75] Inventors: Mark A. Sedlack, Cuyahoga Falls; Francis Bernart, Homeworth, both of Ohio

[73] Assignee: Century Products Company, Macedonia, Ohio

[21] Appl. No.: 274,173

[22] Filed: Jul. 12, 1994

[51] Int. Cl.⁶ .............................. A47D 1/10; B60N 2/26
[52] U.S. Cl. .............................. 297/256.13; 297/216.11; 297/216.19
[58] Field of Search .................... 297/216.11, 216.16, 297/216.19, 325, 329, 256.13, 452.65, DIG. 2

[56] References Cited

U.S. PATENT DOCUMENTS

| | | | |
|---|---|---|---|
| 3,596,986 | 3/1970 | LaVerne | 297/452.65 |
| 4,480,870 | 11/1984 | von Wimmersperg. | |
| 4,640,545 | 2/1987 | von Wimmersperg. | |
| 4,681,368 | 7/1987 | Heath et al. | 297/216.11 |
| 4,971,392 | 11/1990 | Young | 297/256.13 |
| 5,067,772 | 11/1991 | Koa | 297/DIG. 2 |
| 5,110,182 | 5/1992 | Beauvais | 297/216.11 |

FOREIGN PATENT DOCUMENTS 2596338  10/1987  France ........................ 297/216.11

*Primary Examiner*—Peter M. Cuomo
*Assistant Examiner*—Anthony D. Barfield
*Attorney, Agent, or Firm*—Graham & James LLP

[57]  ABSTRACT

A NHTSA-safety compliant infant restraint with a number of advantageous features including a linkage mechanism that allows relative movement between the seat and underframe during an impact, to allow for an infant to be transported reclined while the restraint is in a rear-facing mode, while enabling the restraint to comply with NHTSA standards during a crash. The restraint may be used in a forward facing, non-rotatable position as well. A plurality of seat back incline positions may be selected for both the rearward and forward-facing modes.

11 Claims, 5 Drawing Sheets

RECLINING RESTRAINT (SMART MOVE)

BACKGROUND OF THE INVENTION

This invention relates to a child restraint seat. Child restraints generally are of the type which can be secured to the seat of an automobile, containing restraining straps extending from the back of the seat, behind the shoulders of the baby, down over the baby's torso, to join in the pelvic area between the baby's legs, and finally terminating in a buckle in the automobile seat. Generally such type of child restraints are contoured to fit snugly in the profile of an automobile seat. Such child restraints can either face forward or face rearward, or both, depending on the size, age, and weight of the child being held, among other factors.

SUMMARY OF THE INVENTION

The present invention is intended to provide an improved child restraint having a plurality of advantageous features, including but not limited to, a five-point harness system, an easy-to-use recline feature, and the unique use of a impact-activated linkage for the better distribution of impact forces and positioning of the seated child during a collision.

The present invention allows for the redistribution and absorption of energy and impact forces generated during a crash, to improve the distribution of impact forces. This is accomplished through the use of a novel spring biased mechanism linking the carrier body of the child restraint to the carrier underside in a rotatable, slidably secured manner, that allows the seat, when used in a rearwardly facing fashion, to rotate from a more comfortable reclined position to a more crash safe upright position in the event of a crash.

The present invention allows an infant to travel in a fully-reclined position, when the child seat is oriented in a rear-facing fashion, which certain infants, such as premature infants, low birth weight infants and infants with respiratory and heart problems find particularly helpful, and which some infants may find more comfortable. Ordinarily, traditional infant carrier designs allow seating only in the upright position. The upright position has been mandated by federal safety laws, because in an automobile crash forces are better distributed across an infant's back and shoulders when the infant is upright, as opposed to when the infant is lying reclined. In a reclined position, crash forces are distributed over the more vulnerable head and neck area of the infant. Thus in the past the federal government's National Highway Traffic Safety Administration (NHTSA) has forbade reclined positions in child carriers, as not affording sufficient protection in a crash. However, the design of the present invention has resulted in a change to this longstanding rule. In the present invention, when used in a rearwardly facing manner in an automobile seat, the child carrier may be used in the more comfortable reclined position, and in the event of an impact the child carrier rotates from a reclined, travel position to a protective, upright crash position. Guide tracks help allow smooth rotation between the carrier body and underframe. The rotation arises in response to forces generated by the moments of inertia of the carrier.

Thus the present invention allows for the infant carrier, when used in a rearwardly facing direction while on a car seat, to be used in a more comfortable or medically preferred reclined position, while allowing the infant seat to rotate to a more crash-safe upright position in the event of an impact, thus meeting federal safety standards.

The present invention is also designed so that during such a rotation moving parts in the infant carrier would be either inaccessible or small enough so that the parts would not injure a child's fingers or limbs.

Another object of the present invention is to allow the child carrier to be used in a forwardly facing direction while on a car seat, which is often the way larger children (toddlers) prefer to be transported. When the present invention is used in a forwardly facing direction the infant carrier body does not rotate with respect to the base upon impact, but operates more like a conventional infant carrier.

Yet another object of the present invention is to allow the seat back of the infant carrier to be inclined to a plurality of angular incline positions. The incline positions are for adjusting the relative angle of inclination of the seat with respect to the horizontal or vertical planes. There are a plurality of such incline positions for both when the carrier is used in the forwardly and rearwardly facing directions.

The present invention is manufactured from molded plastic material in a unitary design, with a styrofoam shell construction. The infant restraint of the present invention is preferably designed for infants up to 20 pounds and toddlers from 20 to 40 pounds.

DETAILED DESCRIPTION OF THE PREFERRED EMBODIMENTS

Referring to the figures, there is shown a child carrier or child restraint 5 of the present invention in prospective view, having a seat cover 10, a five-point harness system (preferably without a bellows) holding a belt buckle and belt release and two shoulder straps. The belts of the harness may be anchored behind the carrier on a metal plate fastened to carrier body 15. The harness is of a known design and comprises a five-point system employing two straps in the front of the carrier, one for tightening the shoulder straps by pulling and one for loosening the straps by pulling. The carrier body 15 may be made of a thermoplastic or thermosetting plastic composite molded into a thin outer shell and supporting an inner layer of styrofoam for reduced weight. A detachable fabric cover may clip onto the outside of the carrier body 15.

Figure 5:
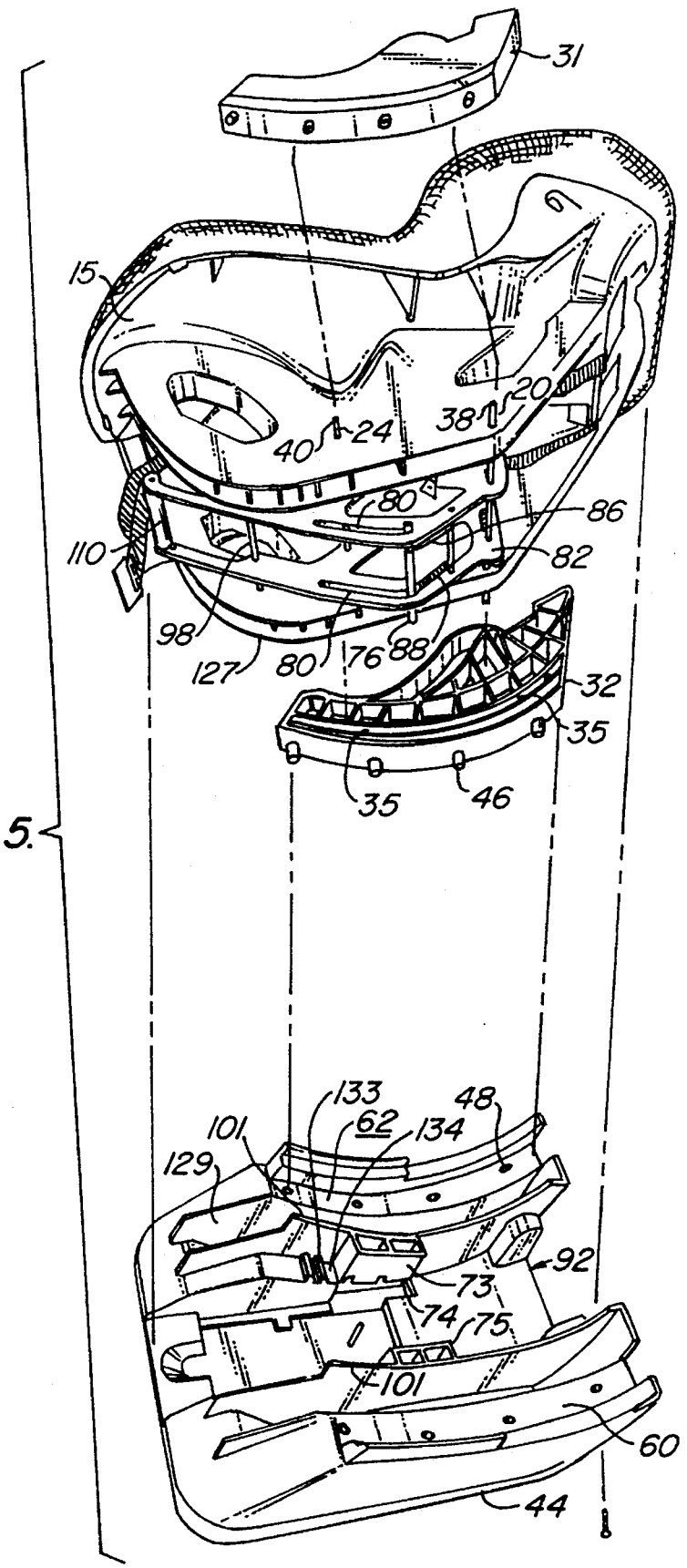
FIG. 5 shows the reclining infant restraint in exploded view.
Figure 6:
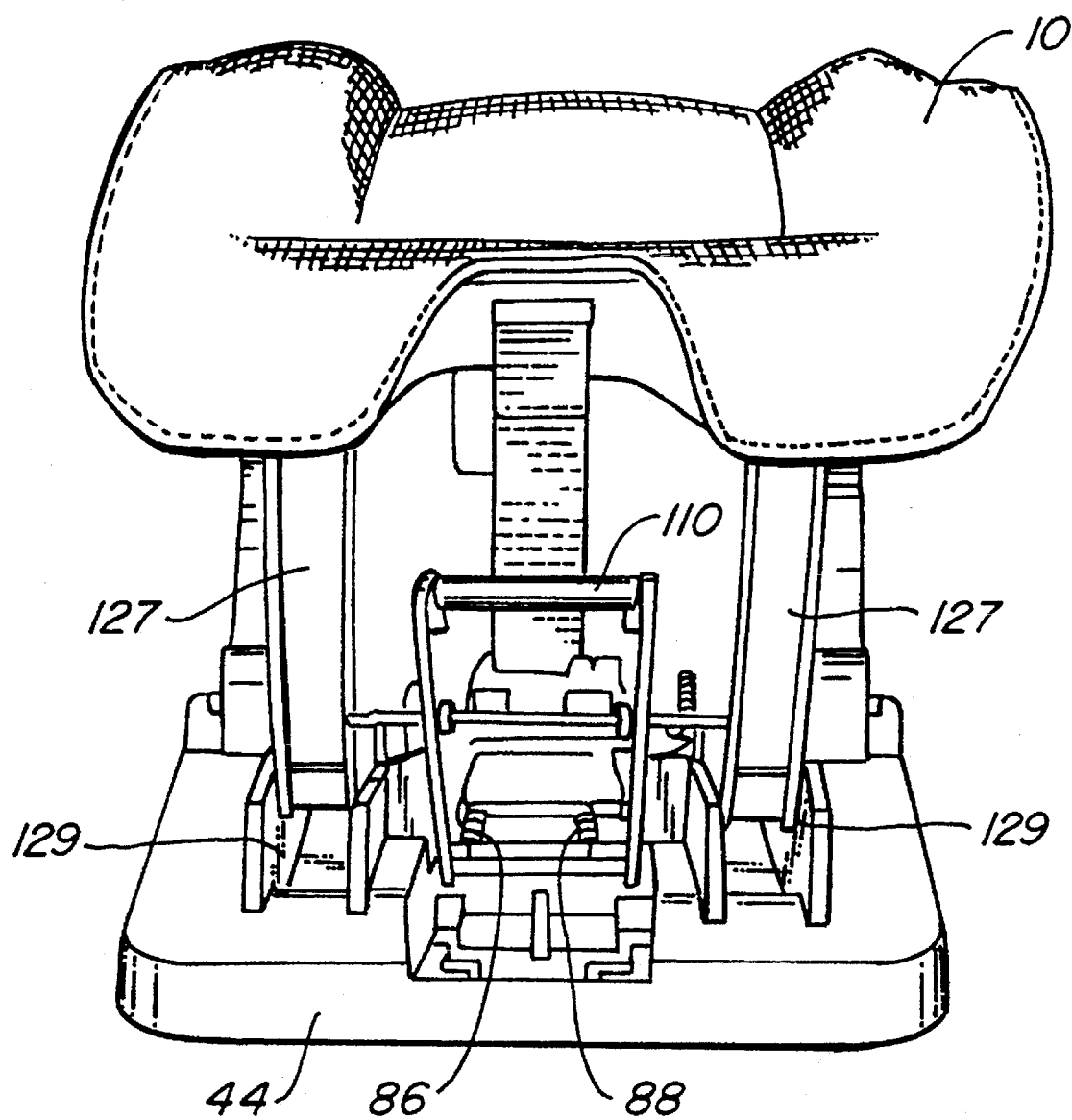
FIG. 6 shows the reclining infant restraint from a ground level front view.

As shown in FIG. 5, the carrier body 15 is of a one piece design, with a plurality of metal rods 20, 24 embedded through therein, that support an adjustable recline mechanism 82. Metal rods 20, 24 have protruding tip 38, 40 (on both sides) that function as guide rods to help steer the carrier body 15 in a curvilinear manner with respect to the underlying carrier underbody base 44. Two sliding side panels 31, 32, also made of molded plastic, have guide tracks molded therein, such as curvilinear track 35 in side panel 32. The protruding tips 38, 40 of metal rods 20, 24 engage the curvilinear tracks, such as when track 35 serves as a guide channel for the tip 38. The tips 38, 40 engage and are steered by the guide channels formed by the curvilinear tracks when the carrier base or underbody 44 rotates relative to the upper body. A similar track and tip engaging system operates on the other side of the carrier (not shown). The guide rod tips and guide tracks, along with the other sliding surfaces such as bar 76 in slot 80 and support rod 98 on cam surface 101, as explained below, may be thought of as cams and cam followers.

Carrier base or underbody 44, is made of a thermoplastic or thermosetting plastic molded in one-piece, and is fixedly engaged to the sliding side panels 31, 32 through protrusions 46 that are matched by receiving bores 48. Bores 48 receive threaded Torx$^R$ fasteners 52 from the underside 56 of the underbody frame or base 44. As can be seen, the corresponding bay portions 60, 62 of the underbody frame can be molded to exactly match the contour of the sliding side panels 31, 32.

When the child carrier is used in a rearwardly facing position on an automobile seat, the portions of the base 44 that have rod holder recesses or stops 70, 72 receive a traveling rod 76. A non-through-extending positioning and support rod 98, a rod that does not extend through the carrier body 15, has ends that overextend onto and slide on cam surfaces 101 (FIG. 5). Positioning and support rod 98 aids, along with the other mating surfaces such as the guide tips and tracks, in the translation and angulation of the upper body 15 as it moves with respect to the lower base 44, when the seat is used in the backwardly facing direction. Otherwise, when the carrier is used in a forwardly facing direction, the traveling bar 76 lies outside of recesses 70, 72 and is not constrained by these stops, and positioning rod 98 drops down from the cam surfaces 101 and into one of two recesses 133, 134, depending on the angle of inclination the user desires, which can be selected by manipulating handle 110.

When the carrier is set up for rearward facing operation, traveling rod 76, secured in one of the two pairs of stops 70, 72, slides within slot 80 in reclining mechanism 82 during impact, allowing relative rotation of the carrier body 15 with respect to the base to a fully upright position. Traveling rod 76 is opposed in its travel along slot 80 by impact springs 86, 88.

Further note the plurality of rod holder recesses 70, 72 allow for two predetermined angles of inclination of the seat back with respect to the vertical or horizontal planes.

Figure 1:
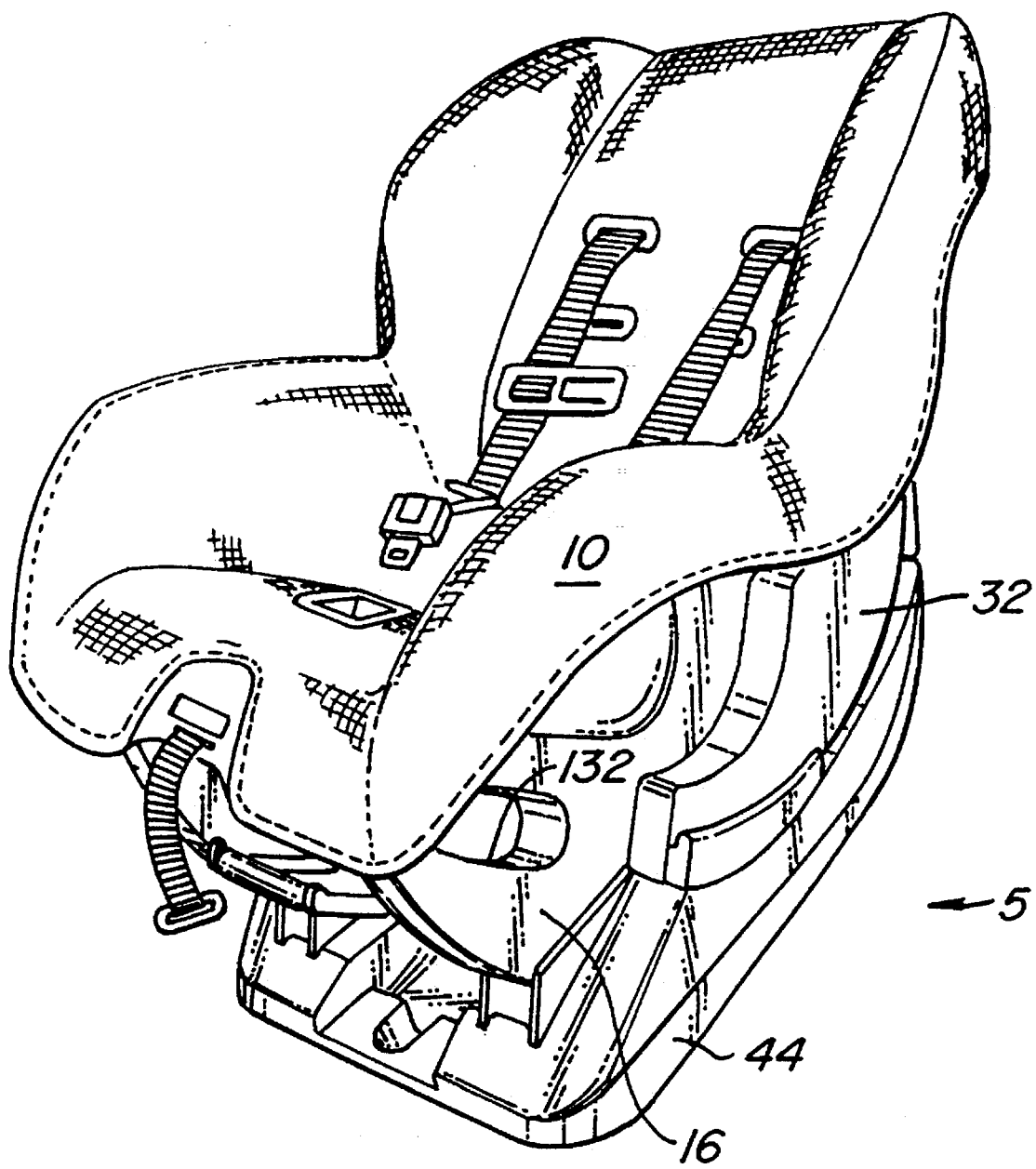
FIG. 1 shows a prospective view of the reclining infant restraint.
Figure 2:
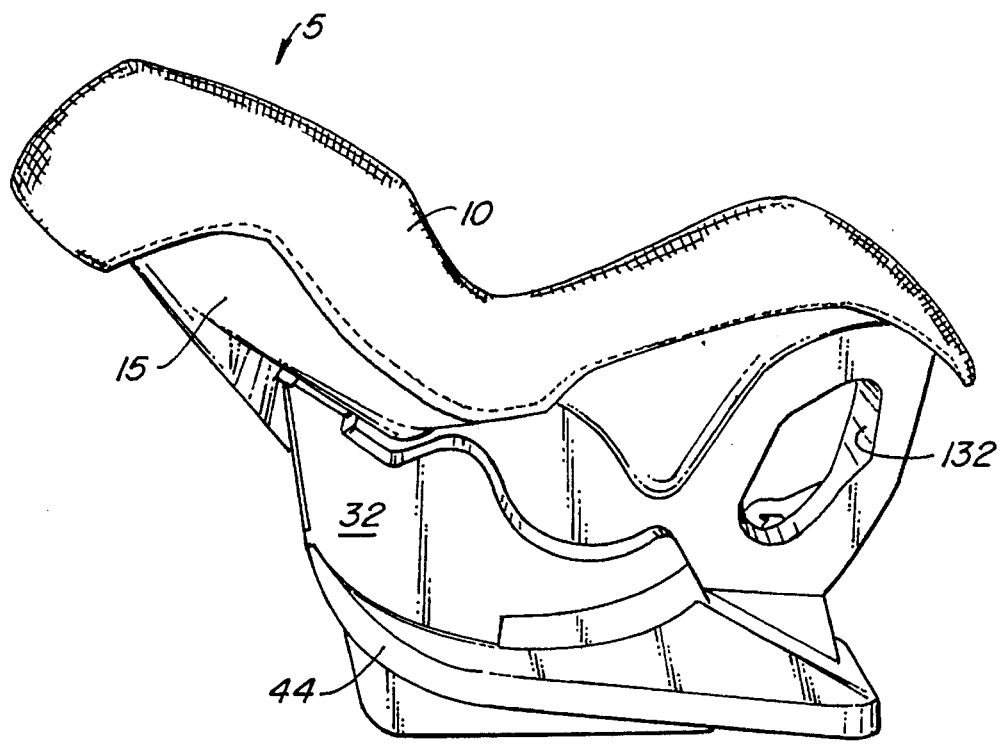
FIG. 2 shows a prospective side view of the reclining infant restraint.
Figure 3:
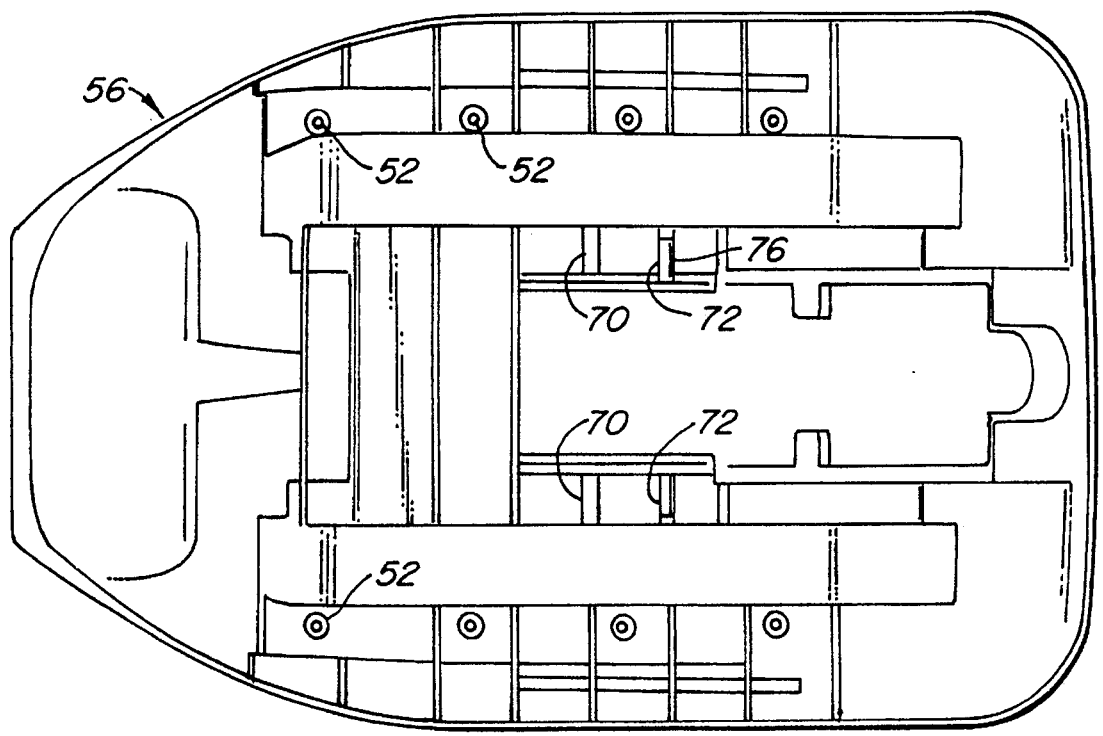
FIG. 3 shows a bottom view of the reclining infant restraint.
Figure 4:
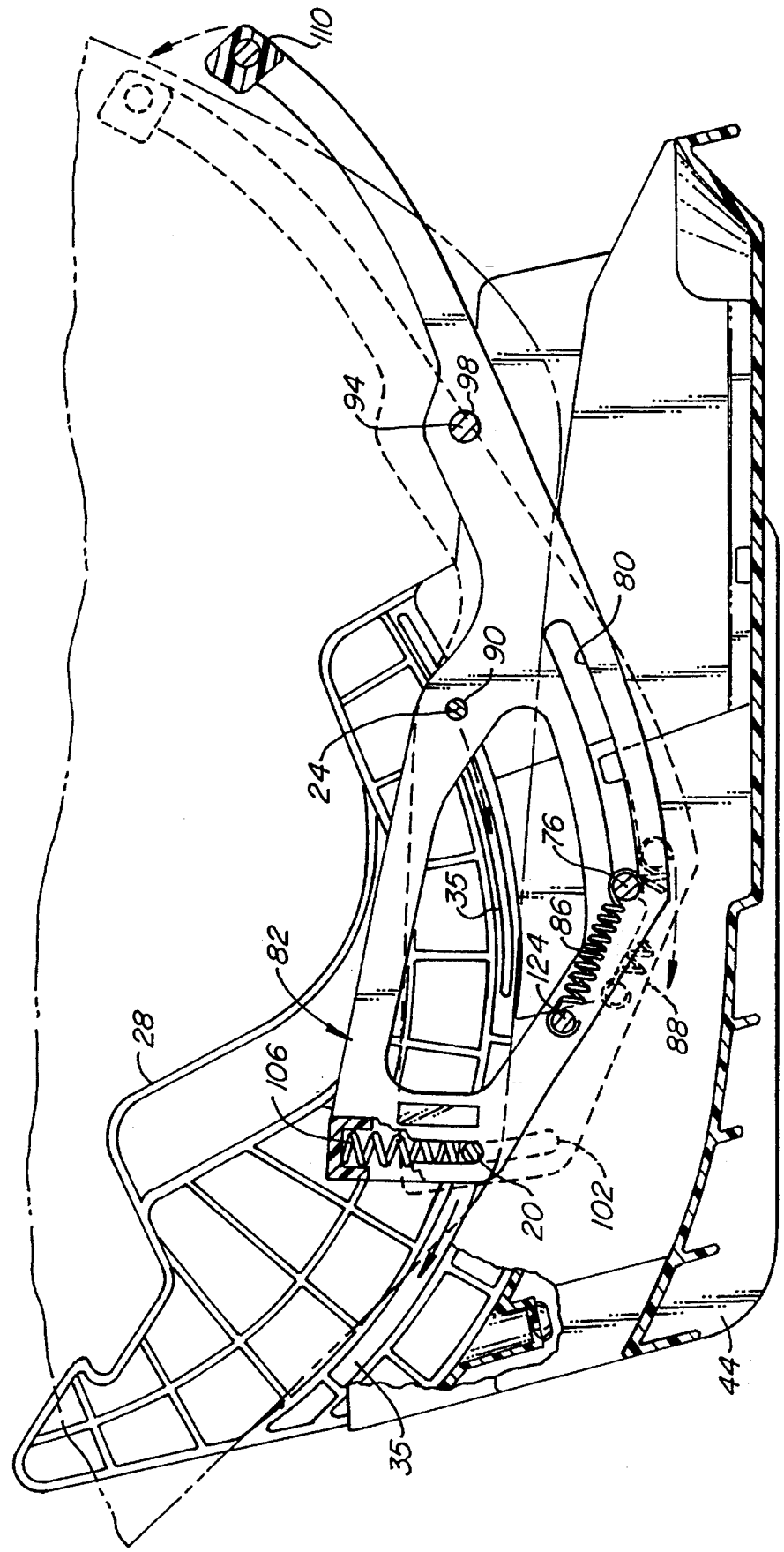
FIG. 4 shows a cross-sectional view of the reclining infant restraint.

Turning attention now to FIG. 4, there is shown the reclining mechanism 82, which incorporates springs 86, 88, and serves to connect and secure the carrier body 15 to the base 44 in a non-rigid manner, that is, allowing slidable translation and/or rotation of the body with respect to the base. The recline mechanism 82 is also used to adjust the angles of seat back inclination, so that the seat back may be adjusted one of a plurality of predetermined incline positions with respect to the vertical. In the preferred embodiment two such incline positions are provided. Thus the reclining mechanism 82 allows for the selective angular inclination of the upper body with respect to the lower base, as well as providing a non-rigid connection to allow the seat to flip upright in a crash. That is, once a particular angular inclination is selected, the mechanism 82 allows for relative motion between the upper body and lower base only in the event of an impact, to allow the body 15 to move from a reclined position to a more upright position, which is a preferred position for an infant or toddler during a crash.

As can best be seen in FIG. 4, a generally crescent-shaped, symmetrical cradle or lever forms the recline mechanism 82, with a pivot hole 90 that receives through-extending pivot and guide rod 24, a guide rod that extends through the carrier body 15 and exits out the sides of the carrier body. Reclining mechanism 82 rotates about through-extending pivot and guide rod 24. A centering rod hole 94 receives a non-through-extending positioning and support rod 98, whose ends can overextend onto and slide on cam surfaces 101. The user may configure the infant carrier for rearwardly facing use by manipulating handle 110 so that traveling rod 76 engages stops 70 or 72. Furthermore, when the seat is configured for a rearwardly facing (crash-rotatable) position, positioning and support rod 98 will aid in the translation of the upper body 15 with respect to the lower base 44, along with the other mating surfaces such as the guide tips and tracks, by engaging at its tips the cam surfaces 101.

For forward facing (non crash-rotatable) configuration of the seat, the user may manipulate handle 110 so that traveling rod 76 disengages from either of stops 70, 72, and positioning and support rod 98 drops down from cam surfaces 101 to engage one of the pairs of forward facing recesses 133, 134. The pairs of recesses 133, 134 are for adjusting the angle of incline for the carrier in the forward facing position.

Turning once again to FIG. 4, a second through-extending support and guide rod 20 is received in a generally vertically extending slot 102, with a bias spring 106 opposing relative motion between the reclining mechanism 82 and the rod 20, which tends to force handle 110 in a down position. As shown by the dot and dashed outline of the reclining mechanism 82 in FIG. 4, lifting handle 110 up will disengage the ends of traveling rod 76 from either rod holder recess 70 or 72 (or positioning rod 98 from recesses 133, 134 when the seat is used in a forward facing configuration) to allow a user to impart relative motion between carrier body 15 and base 44, so that a new angle of inclination between the body and base may be selected.

As before, the infant restraint of the present invention allows for the adjustable reclining of the carrier body to a plurality of positions, in the preferred embodiment two positions for the rearwardly facing configuration and two positions for the forwardly facing configuration. Relative motion between the carrier body 15 and base 44 is limited once the angle of inclination is selected and the recesses or stops are engaged. In the rearwardly facing configuration, when an angle of inclination is selected, there is no relative rotation of the carrier body 15 and base 44 except upon impact. In the forward facing configuration, the carrier of the present invention operates like any other traditional child safety seat, and does not rotate upon impact.

In the rearwardly facing configuration of the child carrier, one means for engagement between the carrier body 15 and base 44 is provided through the traveling metal rod or bar 76, which is received at its ends in one of two rod holder recesses 70, 72 formed integrally in the underside 56 of carrier body 15. Traveling metal rod 76 in turn is attached to fixed bar 124 via two springs 86, 88. The tension present in tension springs 86, 88 keeps rod 76 engaged in the recesses 70, 72, until such time that a user pulls on handle 110 to an "up" position. As can be seen most clearly in FIG. 4, at that point the recline cradle 82 will pivot about the through extending pivot rod 24, in opposition to bias spring 106, and cause bar 76 to rise up and out of the rod holder recesses 70, 72. The carrier body 15 is then free to be rotated by the user to a new incline position, all the while constrained to travel along an arcuate path as dictated by the path the tips 38, 40 travel along the curvilinear tracks, such as track 35.

Bar 76 is part of the recline cradle 82 that is pivotally secured to the carrier body 15 through extending pivot rod 24 that extends through pivot hole 90 in the recline cradle 82. A second rod, extending rod 20, also serves to fix recline cradle 82 to the carrier body 15, and is held in vertically extending slot 102 by compression spring 106. Once again the ends 38, 40 of bars 24 and 20 serve to engage tracks, such as track 35, in the inner side of sliding side panels 31, 32, to guide the relative motion between the seat body 15 and the base 44 in an arcuate path. Thus bars 24 and 20 are long enough to pass through both the width of recline cradle 82, through portions in the carrier body 15, and with enough length at ends 38, 40 left over on both sides of the carrier body 15 to engage curvilinear guide track 35 of the sliding side panel 32, as well as another, matching curvilinear guide track (not shown) on side panel 31.

Traveling bar 76 is received by rod holder recesses 70, 72 that are integrally formed as part of brackets 73, 75, formed one-piece with the base 44. As can best be seen by noting FIG. 5, recline cradle 82 is sized to fit in between brackets 73, 75, and inside the arcuate recess 92 in the base 44, the recess being open on the right hand side shown in FIG. 5. Traveling rod 76 is wider than recline cradle 82 by enough so that the end portions of the traveling rod 76 engage stops or recesses 70, 72. The leading edge of the brackets, such as edge 74 of bracket 73, is beveled to allow the ends of traveling bar 76 to ride up and into the recesses 70, 72 of the brackets 73, 75 during assembly of the infant carrier. To disengage rod 76 from recesses 70, 72, the handle 110 is lifted up, and as traveling rod 76 is offset from through-extended pivot rod 24, it rotates about the pivot rod 24, and lifts in the opposite direction down and away from recesses 70, 72, which point downwards when the device is assembled as seen in FIG. 5. At this point the carrier body 15 is free to rotate in a substantially arcuate path with respect to the base 44 to another reclined position. In the preferred embodiment only two inclined positions are possible for when the seat is configured for the rearwardly facing position, each incline position requiring one of the two pairs of recesses 70, 72, but in general a plurality of predetermined reclined angulations or positions may be employed. Likewise only two incline positions are possible for when the seat is configured for the forwardly facing position, the two positions corresponding to the two recesses 133, 134 that are engaged by positioning rod 98.

Further regarding the present invention, note the mating engagement between carrier body 15 and base 44 provided for by mating rib portions 127 and rib receiving groove portions 129 built into base 44 in a unitary manner. Rib portions 127 may have holes 132 build into them to secure an automobile seat belt when using the infant restraint in a rear-facing mode.

Turning attention now to the description of the shock absorbing properties of the present invention, it should be noted that while the traveling rod 76 is engaged in recesses 70, 72, there is comparatively little relative movement between carrier body 15 and base 44, such relative movement restricted to how much the springs 86, 88 can elongate. That is, relative movement is not prohibited, because the linkage holding the traveling bar 76 to the recline cradle 82, and thus the carrier body 15 to the base 44, is not a rigid one but a resiliently biased one provided in part through tension springs 86, 88. Thus, carrier body 15 may move or rotate with respect to the base 44 by an amount proportional to the distance available in the arcuate slot 80.

By placing the infant restraint in a rearward facing direction and in a rearwardly facing mode, so that bar 76 is held in stops 70 or 72, an infant in the infant restraint may travel in a comfortable, inclined travel position. When a frontal impact occurs, which is the most typical type of automobile crash, the forces due to inertia will cause relative motion between the body 15 and base 44. Springs 86, 88 will be elongated during this relative motion, and will seek to return the body and base to their equilibrium position before the crash. In response to these inertial forces body 15 will travel in an arcuate path from an inclined position to an upright position with respect to the base 44 as the protruding tips 38, 40 travel along the guide channels, such as guide channel 35.

The springs forming the linkage of cradle 82, together with the inertial properties of all the components comprising the infant carrier, are selected so that once a predetermined seat incline position between the body 15 and base 44 are selected, there is a secure connection with little or no relative movement between body and base, even in sudden but normal braking stops. Thus the threshold for movement between body and base in the event of an impact should be high enough so that relative movement will not occur when a vehicle comes to a normal, albeit sudden, stop. However, relative movement should occur in the event of a collision, even a minor "fender bender" type collision. It has been found that a threshold for impact of greater than 1 G in force is suitable as a threshold above which relative movement between body and base will result, but below which there will be little or no relative movement. A larger or smaller threshold may be selected.

While in the preferred embodiment a pair of springs are shown as the means for absorbing energy and providing resilient bias, in general any different number of energy absorbing resilient devices may be employed, without departing from the scope of the invention.

The foregoing description is offered for illustrative purposes only. Numerous modifications and variations may be readily apparent to those skilled in the art, while still falling within the spirit and scope of the invention as claimed herein below.

What is claimed is:

1. A restraint seat having an adjustable seat inclination with enhanced safety features during impact forces comprising:

a body forming a seat;

a base, said seat adjustable to move relative to said base to a plurality of predetermined angles of inclination to allow said seat to be fixed with respect to said base at one of said angles of inclination;

said body rotatable with respect to said base from said predetermined angles of inclination and a mechanism for connecting said base to said body to allow said adjustable movement, said connecting mechanism including a spring connected to said body and said base, and a recline lever pivotally connected to said body and having a portion selectively engaging stops on said base to allow for the selective inclination of said body with respect to said base to said plurality of predetermined angles of inclination said portion of said recline lever comprising a bar slidably contained in a slot in said lever and lying traverse to said slot, said bar connected to said spring and engaging said stops at the ends of said bar, said mechanism holding said body at said predetermined angles of inclination with respect to said base during ordinary travel and adjustable to allow said seat to be fixed with respect to said base at one of said plurality of predetermined angles of inclination, but said mechanism allowing said body to move relative to said base during a sudden impact, whenever the impact forces exceed a predetermined value.

2. A child restraint seat convertible between an inclined travel mode for infants and an upright travel mode for toddlers, comprising:

an upper body forming a seat;

a lower frame forming a base;

means for connecting the upper body to the lower frame, said means for connecting allowing said upper body to be secured to said lower frame in a non-rigid manner to allow said seat to be substantially inclined during travel but to rotate upright with respect to said lower frame during an impact, when said means for connecting are in one position and when said seat is in a rearwardly facing position, and allowing said seat to remain substantially upright with respect to said lower frame both during travel and during an impact, when said means for connecting are in another position and when said seat is in a forwardly facing position, said means for connecting said upper body to said lower frame in a non-rigid manner comprising a mechanism having a bar supported in a slot in said mechanism, said bar extending along the mechanism transverse to the slot with the bar engaging the base and attached to spring fixed to the mechanism, said mechanism pivotally secured to said upper body, said bar free to move along said slot as the upper body moves relative to the frame upon impact.

3. The restraint seat according to claim 1, wherein the bar has ends that engage a plurality of recesses in the lower frame, so that the seat may be inclined at a predetermined angle of inclination relative to the base depending on which recess is engaged by the bar.

4. The restraint according to claim 3, wherein the lower frame receives a pair of vertically extending side panels having guide tracks formed therein, and further comprising a first rod and a second rod, the rods extending through the upper body and having ends that project out the sides of the body and are received by the guide tracks, the rod ends being steered by the guide tracks as the body moves with respect to the frame.

5. The restraint according to claim 2, wherein the lower frame receives a pair of vertically extending side panels having guide tracks formed therein, and further comprising a first rod and a second rod, the rods extending through the upper body and having ends that project out the sides of the body and are received by the guide tracks, the rod ends being steered by the guide tracks as the body moves with respect to the frame, wherein said means for connecting said upper body to said lower frame comprises a second mechanism, said second mechanism when securing the restraint for an upright travel position comprises a bar fixed to said second mechanism, said second mechanism rotatably secured to said upper body, said fixed bar selectively engaging a plurality of recesses in the lower frame, to secure said upper body at a predetermined angle of inclination with respect to said lower frame.

6. The restraint according to claim 5, wherein the plastic upper body, plastic lower frame and side panels are made of a one-piece unitary construction, and the lower frame has two curvilinear bays shaped to receive the side panels, and the upper body is formed of a two-piece construction comprising an outer plastic shell and an inner styrofoam layer.

7. A restraint of unitary construction comprising:

a one-piece molded plastic seat;

a one-piece molded plastic base, said seat capable of relative movement to said base;

a non-rigid connection between said seat and said base, said non-rigid connection comprising a cradle having a spring connecting said seat to said base;

whereby said seat is moveable relative to said base during an impact, and said spring is elongated in response to impact forces on said infant restraint, and said seat moves with respect to said base, in response to inertial forces, from a prone travel position to an upright crash position during impact;

wherein said non-rigid connection cradle has a bar connected to said spring, said bar supported in two slots on said cradle and engaging said base at one of a plurality of recesses on said base, said cradle fixed to move with said seat, and said bar fixed to move with said base, said cradle adjustable so that said bar may engage any of said plurality of recesses to give a plurality of angles of inclination between the seat and the base.

8. A restraint seat having an adjustable seat inclination with enhanced safety features during impact forces comprising:

a body forming a seat;

a base, said seat adjustable to move relative to said base to a plurality of predetermined angles of inclination to allow said seat to be fixed with respect to said base at one of said angles of inclination;

said body rotatable with respect to said base from said predetermined angles of inclination; and a mechanism for connecting said base to said body to allow said adjustable movement, said connecting mechanism including a spring connected to said body and said base, and a lever pivotal about and fixed to said body, said lever holding a bar mounted transverse to said lever in a slot in said lever, said bar attached to said spring and said base, said bar selectively engaging stops on said base to allow for said rotation of said body with respect to said base to said plurality of predetermined inclinations, said mechanism holding said body at said predetermined angles of inclination with respect to said base during ordinary travel and adjustable to allow said seat to be fixed with respect to said base at one of said plurality of predetermined angles of inclination, but said mechanism allowing said body to move relative to said base during a sudden impact, whenever the impact forces exceed a predetermined value.

9. The restraint seat of claim 8, further comprising:

a plurality of rods passing through said body, transverse to said lever, to secure said lever to said body;

said rods having ends projecting out the sides of said body;

a pair of guide tracks mounted in a pair of vertically extending side portions attached to said base, said guide tracks receiving said rod ends, said guide tracks being curvilinear and guiding the relative movement of said body with respect to said base, a pair of brackets mounted on said base, said brackets supporting said bar, and a plurality of recesses in said brackets forming said stops to support said bar.

10. The restraint seat of claim 9, wherein said base is molded from plastic and configured with recesses that receive said side portions, said brackets are one-piece with said molded plastic base, and said body comprises an outer plastic shell and an inner styrofoam layer.

11. A restraint seat having an adjustable seat inclination with enhanced safety features during impact forces comprising:

a body forming a seat;

a base, said seat adjustable to move relative to said base to a plurality of predetermined angles of inclination to allow said seat to be fixed with respect to said base at one of said angles of inclination;

said body rotatable with respect to said base from said predetermined angle of inclination; and a mechanism for connecting said base to said body to allow said adjustable movement, said connecting mechanism including a spring connected to said body and said base, a first rod and a second rod, said rods extending through said body and having ends projecting out the sides of said body, said connecting mechanism further including a cradle pivotally secured to said body about said first rod, said cradle containing two slots, a substantially vertically extending slot and an arcuate substantially horizontally extending slot, said vertically extending slot receiving said second rod, and having a compression spring fitted therein to engage said second rod, and said horizontally extending slot receiving a bar, said bar being positioned transverse to said horizontal slot and engaging said base at the ends thereof, said spring being attached to said bar and to said cradle, wherein said spring is elongated and said bar moves along said horizontally extending slot as said body is rotated with respect to said base, said mechanism holding said body at said predetermined angles of inclination with respect to said base during ordinary travel and adjustable to allow said seat to be fixed with respect to said base at one of said plurality of predetermined angles of inclination, but said mechanism allowing said body to move relative to said base during a sudden impact, whenever the impact forces exceed a predetermined value.

* * * * *